United States Patent Office 2,810,706
Patented Oct. 22, 1957

2,810,706

OXIRANE TRIAZINE RESINOUS COMPOSITIONS AND PROCESSES OF PREPARING THE SAME

Charles Frazier, Yonkers, N. Y., and Leonard E. Cadwell, Springdale, Conn., assignors to American Cyanamid Company, New York, N. Y., a corporation of Maine No Drawing. Application July 1, 1953, Serial No. 365,545

27 Claims. (Cl. 260—45.5)

This invention relates to a novel composition of matter and to the process of preparing the same. More particularly, this invention relates to a novel composition of matter comprising the polymeric reaction product of (1) an alpha, beta unsaturated carboxylic acid and (2) a different polymerizable compound containing a $CH_2=C<$ group, having an acid number of at least 15 and preferably between 25 and 100, in physical admixture with the dehydrohalogenated reaction product of a monohalohydrin of a saturated aliphatic trihydric alcohol and a compound having the general formula:

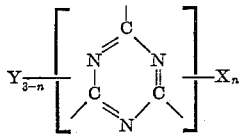

wherein X represents a halo group, Y represents (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and $n$ represents an integer which is at least 1 and not more than 3. More particularly this invention relates to a novel composition of matter comprising the polymer of (1) an alpha, beta unsaturated carboxylic acid, (2) an alkyl ester of an alpha, beta unsaturated carboxylic acid and (3) a polymerizable compound different from (1) and (2) containing a polymerizable $CH_2=C<$ group, said polymer having an acid number of at least 15, in physical admixture with the dehydrohalogenated reaction product of a monohalohydrin of a saturated aliphatic trihydric alcohol and a compound having the general formula:

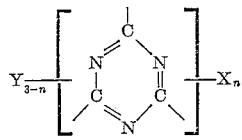

wherein X represents a halo group, Y represents (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and $n$ represents an integer which is at least 1 and not more than 3.

One of the objects of the present invention is to produce a composition of matter substantially as described hereinabove. A further object of the present invention is to produce a surface coating composition having excellent mar resistance, excellent chemical resistance, together with outstanding flexibility, color retention and color stability. These and other objects of the present invention will be discussed more fully hereinbelow.

In the preparation of the composition of the present invention, one may react the alpha, beta unsaturated carboxylic acid and different compounds containing the polymerizable $CH_2=C<$ group, preferably in the presence of an inert organic solvent and then physically mixed with the oxirane derivatives as described hereinabove. This physical admixture may then be applied as a coating composition by drawing down films therefrom and dried either by air drying or baking to produce a film having all of the desirable properties indicated hereinabove.

The oxirane triazines which are used as a reactant in the practice of the process of the present invention is a polymerizable compound containing both a triazine ring and at least 1 and not more than 3 reactive epoxy groups. These polymerizable oxirane compounds containing at least one oxirane ring and a triazine ring may be obtained by reacting a monohalohydrin of a saturated aliphatic trihydric alcohol wherein the halogen grouping is selected from the group consisting of chlorine, bromine and iodine with a compound represented by the general formula:

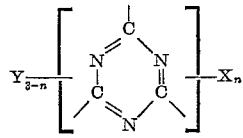

wherein X represents a halo group, Y represents (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and $n$ represents an integer which is at least 1 and not more than 3. From a consideration of the above formula it will be noted that when small $n$ is 3 there will be no radicals represented by Y added to the triazine nucleus.

Illustrative examples of hydrocarbon radicals which R, R' and R" may represent in the above formula are as follows: The saturated aliphatic radicals such as methyl, ethyl, propyl, isopropyl, butyl, isobutyl, tertiary butyl, amyl, isohexyl, octyl, decyl, dodecyl, octadecyl and the like, including saturated cycloaliphatic radicals such as cyclopentyl, cyclohexyl, cycloheptyl and aromatic substituted saturated aliphatic groups such as benzyl, phenylethyl, phenylpropyl, phenylisopropyl, etc.; aromatic groups such as phenyl, biphenyl, naphthyl, etc., including saturated aliphatic substituted aromatic groupings e. g. tolyl, xylyl, ethylphenyl, propylphenyl, isopropylphenyl, butylphenyl, etc. Illustrative examples of alkenyl radicals which may be employed in the above formula are allyl, methallyl, ethallyl, propallyl, 2-butenyl, 3-butenyl, 3-methyl-2-butenyl, 3-methyl-3-butenyl, 2-pentenyl, 3-pentenyl, 4-pentenyl, 2-methyl-2-pentenyl, 3-methyl-4-pentenyl, 2-hexenyl, 3-nonenyl, etc. Examples of compounds embraced by the formula set forth here and above which are reacted with a monohalohydrin of a saturated aliphatic trihydric alcohol to form the reactant (4) here and above are as follows: cyanuric chloride; 2,4-dichloro-1,3,5-triazine; 2,4-dibromo-6-phenyl-1,3,5-triazine; 2,4-dichloro-6-methyl-1,3,5-triazine; 4,6-diiodo-2-alloxy-1,3,5-triazine; 2,4-dichloro-6-methoxy-1,3,5-triazine; 2-amino-4,6-dichloro-1,3,5-triazine; 2-butylamino-4,6-dibromo-1,3,5-triazine; 2-diallylamino-4,6-dichloro-1,3,5-triazine; 2,4-diamino-6-chloro-1,3,5-triazine; 2-amino-4-bromo-6-methylamino-1,3,5-triazine; 2-amino-4-iodo-6-o-toluino-1,3,5-triazine; 2 - chloro - 4 - di(n - butyl)amino - 6 - ethylamino - 1,3,5 - triazine; 2,4 - bis (diallylamino) - 6 - fluoro - 1,3,5 - triazine; 2 - chloro - 4 - hexylamino - 6 - phenylethylamino - 1,3,5 - triazine; 2 - amino - 4 - bromo - 6 - propyl - 1,3,5 - triazine; 2 - amino - 4 - chloro - 6 - propyl - 1,3,5 - triazine; 2 - chloro - 4 - ethylamino - 6 - phenyl - 1,3,5 - triazine; 2 - butyl - 4 - chloro - 6 - propylamino - 1,3,5 - triazine; 2 - bromo - 4,6 - bis (diallylamino) - 1,3,5 - triazine; 2 - fluoro - 4 - methylamino - 1,3,5 - triazine; 2 - amino - 4 - chloro - 1,3,5 - triazine; 2 - amino - 4 - chloro - 6 - phenoxy - 1,3,5 - triazine; 2 - chloro - 4 - methylamino - 6 - methoxy - 1,3,5 - triazine; 2 - di(n - butyl)amino - 4 - iodo - 6 - methoxy - 1,3,5 - triazine; 2 - bromo - 4 - diethylamino - 6 - phenoxy - 1,3,5 - triazine; 2 - bromo - 4 - ethoxy - 6 - octylamino - 1,3,5 - triazine; 2 - cyclohexylamino - 4 - ethoxy - 6 - iodo - 1,3,5 - triazine; 2,4 - diethoxy - 6 - fluoro - 1,3,5 - triazine; 2 - chloro - 4,6 - dibutoxy - 1,3,5 - triazine; 2 - chloro - 4,6 - diphenoxy - 1,3,5 - triazine; 2 - bromo - 4 - phenoxy - 1,3,5 - triazine; 2,4 - diiodo - 6 - phenoxy - 1,3,5 - triazine; 2 - fluoro - 1,3,5 - triazine; 2 - chloro - 4 - decyl - 6 - p - tertiary - butylphenoxy - 1,3,5 - triazine; 2 - bromo - 4 - phenyl - 6 - p - tertiarybutylphenoxy - 1,3,5 - triazine; 2 - chloro - 4,6 - dipropyl - 1,3,5 - triazine; 2 - chloro - 4 - methyl - 1,3,5 - triazine, and the like.

The monohalohydrins of a saturated aliphatic trihydric alcohol that are used in the reaction with the triazines mentioned hereinabove to prepare the oxirane triazines used in the preparation of the product of the present invention are derivatives of a trihydric alcohol such as glycerol, butanetriol-1,2,4; pentanetriol-1,2,5; hexanetriol-1,2,6 and similar analogs. The halohydrins are distinguished by having at least one primary hydroxyl group and preferably one primary and one secondary hydroxyl. The halogen atom is preferably substituted on a carbon atom adjacent to the carbon atom bearing the secondary hydroxyl. The halogens may include chlorine, bromine and iodine. Alpha monochlorohydrin of glycerol (1-chloropropanediol) is the preferred alcohol halide and simple analogs may be represented by

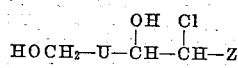

where U represents alkylene radicals and Z represents hydrogen and aliphatic radicals. Thus, the halohydrins may include 1-chloro-butanediol-2-4; 3-chloro-pentanediol-1,4; etc. Glycerol-beta-mono-chlorohydrin represents a compound where a diprimary hydroxyl bearing monohalohydrin may be utilized in our invention. Other halohydrins that find use in our invention are such as 3-chlorobutanediol-1,2; 2-bromobutanediol-1,3; 1-chloropentanediol-2,5; 3-iodopentanediol-3,5; 1-chlorohexanediol-2,6; 2-bromohexanediol-3,6; 3-chlorohexanediol-1,2 and the like.

In the reaction between the halotriazine and the monohalohydrin, reaction probably first takes place at the primary hydroxyl position of the latter. In the second stage, the secondary hydroxyl participates in dehydrohalogenation leading to formation of the oxirane ring. Since the halo group of the alcohol is removed from the compound, it is immaterial which halohydrin is used as a starting material from the halo group standpoint.

In order that the present invention may be more completely understood, the following examples are set forth primarily for the purpose of illustration only in which all parts are parts by weight. Any specific enumeration of details set forth in these examples should not be interpreted as limitations on the case except as indicated in the appended claims.

*Preparation of triglycidyl cyanurate*

184 parts of cyanuric chloride and 331.5 parts of glycerol-alpha-monochlorohydrin were dissolved in 1200 parts of dioxane. 240 parts of dry finely powdered sodium hydroxide were added to the vigorously stirred dioxane solution over a period of 2 hours. Some external cooling was necessary to maintain the temperature between 25–35° C. The mixture was stirred for an additional 5 hours at about 30–35° C. and then filtered. The solid was pressed dry, slurried with 300 parts fresh dioxane at 40° C. and refiltered. The combined filtrates were concentrated under reduced pressure, keeping the pot temperature below 35° C. to give 550 parts of solution which was 36.5 percent solids.

*Preparation of 2-glycidyloxy-4,6-dimethoxy-1,3,5-triazine*

5.5 parts of glycerol-alpha-monochlorohydrin and 8.8 parts of 2-chloro-4,6-dimethoxy-1,3,5-triazine were dissolved in 70 parts of dioxane. 4 parts of powdered sodium hydroxide were added and the temperature maintained at 35–38° C. The reaction mixture was stirred 5 hours at 27–30° C. and filtered. The dioxane solution was then vacuum concentrated below 35° C. to give a thin oily reaction product which contained 53.3 percent of the oxirane oxygen expected.

*Preparation of 2-glycidyloxy-4,6-diphenoxy-s-triazine*

2-chloro-4,6-diphenoxy-s-triazine was prepared according to the method described in J. A. C. S. 73, page 2992 (1951). 30 parts of the same together with 11 parts glycerol-alpha-monochlorohydrin were dissolved in 75 parts dioxolane and as the mixture was stirred, 8 parts powdered sodium hydroxide were added over a period of about 20 minutes while controlling the temperature at 25–30° C. Following the addition, this temperature was maintained for an additional hour, then the mixture was filtered. The solution obtained yielded a water white, resinous film when dried at 70° C.

*Preparation of 2-amino-4-glycidyloxy-6-dibutylamino-s-triazine*

1.3 parts of 2-amino-4-chloro-6-dibutylamino-s-triazine and 0.55 part of glycerol-alpha-monochlorohydrin were dissolved in 10 parts acetone and 0.40 part sodium hydroxide reacted therewith at 20–25° C. The solution obtained yielded a partly crystalline product on drying. Infrared absorption technique disclosed the presence of epoxide groups in the product.

*Preparation of 2-amino-4-glycidyloxy-6-phenylamino-s-triazine*

1.1 parts of 2-amino-4-chloro-6-phenylamino-s-triazine and 0.55 part of glycerol-alpha-monochlorohydrin were reacted as above with 0.4 part sodium hydroxide using 10 parts dioxane as solvent. The recovered product was partly crystalline.

*Preparation of 2-glycidyloxy-4,6-di(phenylamino)-1,3,5-triazine*

0.75 part of 2-chloro-4,6-di(phenylamino)-1,3,5-triazine and 0.28 part of glycerol-alpha-monochlorohydrin were reacted in 7.5 parts diethyl ether of ethylene glycol with 0.20 part sodium hydroxide. The product recovered from solution was partly crystalline. When heated, it first melted and then set due to its thermosetting characteristic.

*Preparation of 2,4-diglycidyloxy-6-p-tertiarybutylphenoxy-s-triazine*

2,4-dichlor-6-p-tertiarybutylphenoxy-s-triazine was prepared according to the method described in J. A. C. S. 73, page 2991 (1951). 77 parts of an acetone solution containing 14.9 parts of the triazine and 11.1 parts of glycerol-alpha-monochlorohydrin were agitated as 8.0 parts sodium hydroxide were added. The exothermic reaction was controlled at 20–25° C. for ¾ hour. The temperature was then raised and held at 50° C. 1 hour. The main product isolated in solution form dried at 70° C. to a clear, balsam-like material. This hardened to a clear, slightly brittle film after heating at 120° C. 1 hour. It was then only slightly swelled by contact with acetone. The presence of an epoxide group was revealed by infrared absorption technique and also by titration after digestion with pyridine hydrochloride.

Preparation of 2,4-diglycidyloxy-6-phenoxy-s-triazine 2,4-dichloro-6-phenoxy-s-triazine was prepared from cyanuric chloride, phenol and sodium hydroxide by reaction of equimolecular quantities in acetone water solution at 0–5° C. and isolated in dry crystalline form. 24 parts together with 22 parts glycerol-alpha-monochlorohydrin were dissolved in 50 parts methyl isobutyl ketone and reacted with 16 parts sodium hydroxide at 20–25° C. The reaction product in solution form was examined for its film forming characteristics. When dried at 70° C. the solution yielded a soft, plastic film free of color. Baking at 120° C. for 1 hour was sufficient to harden it to a slightly brittle state. Contact with the original solvent then had practically little effect. The solution of the unpolymerized product withstood dilution with an equal volume of toluene.

The reaction involved in preparing the glycidyl derivatives of these triazines is a two-step mechanism. For example, when cyanuric chloride is reacted with glycerol-alpha-monochlorohydrin in a suitable solvent under mild heating conditions and with the addition of a suitable HCl acceptor, a chlorohydroxypropyl cyanurate type derivative is first formed. The additional HCl acceptor added to the reaction mix dehydrohalogenates the chlorohydroxypropyl groups to glycidyl radicals, thus forming a polymerizable product containing both the oxirane and triazine groups. The following formulas set forth the reaction mechanism:

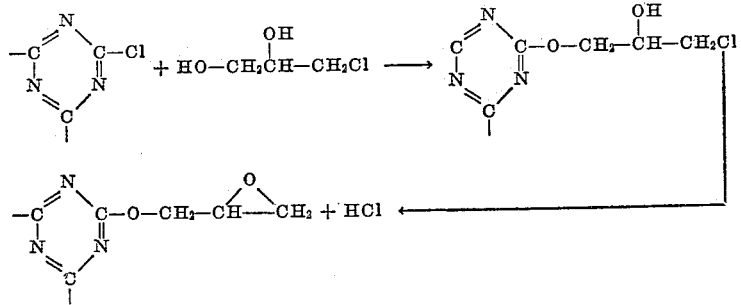

In the preparation of these triazine derivatives, the molar proportion of the monohalohydrin of a saturated aliphatic trihydric alcohol to the triazine compound represented by the general formula shown above will be determined by the number of halogens present in the latter compound. For example, when cyanuric chloride is employed, 3 mols of the monohalohydrin of the trihydric alcohol will be used for each mol of cyanuric chloride if it is desired to produce the tri-substituted derivative. When compounds such as 2-chloro-4,6-dimethoxy-1,3,5-triazine are employed, 1 mol of the monohalohydrin of a trihydric alcohol will be utilized. Correspondingly, when a dihalo triazine compound is utilized, 2 mols of a monohalohydrin of a saturated aliphatic trihydric alcohol will be used per mol of the compound. It will thus be seen that the molar proportion of monohalohydrin to halo triazine may vary from about 1:1 to about 3:1 depending upon the particular halo triazine reacted and the end product desired. A slight excess of monohalohydrin may even be used in our invention if so desired. A molar proportion of less than 1 mol of monohalohydrin per halogen present in the general formula may also be used. Thus, when cyanuric chloride is reacted with a monohalohydrin, 1, 2 or 3 mols of the monohalohydrin may be employed. This variation in the molar proportion of monohalohydrin is also possible when a dihalo compound of the general formula is present. In that instance, 1 or 2 mols of monohalohydrin may be reacted with 1 mol of the dihalo compound.

The temperature of reaction should be within the range of from about 0° C. to about 75° C. with a range of from about 25° C. to about 35° C. preferred for optimum yield. At elevated temperatures the halogen acceptor tends to decompose the oxirane ring, while at low temperatures the removal of the halogens from the triazine compound is not complete and consequently the oxirane yield is low. For high yields of the oxirane triazines a slow addition of an acceptor for the freed halogen, e. g., over a period of 1 to 2 hours, with a minimum amount of cooling necessary to control the exotherm and an additional reaction time of from about 2 to 5 hours with a preferred time of about 4 hours gives the best results. The solvent employed in the process of our invention is limited to those which are non-reactive toward the triazine compound, the monohalohydrin of the trihydric alcohol, the oxirane group formed or the halogen acceptor and must dissolve the reactants and the oxirane containing product. A satisfactory solvent is dioxane. Other solvents that may find employment in the instant process are acetone, ethylene glycol dimethyl ether, diethylene glycol diethyl ether, dioxolane, dimethyl formamide, methyl isobutyl ketone, dichlorobenzene, etc. From an examination of the formula setting forth the reaction mechanism, it will be seen that during the dehydrohalogenation HCl, HI, HF or HBr will be formed depending upon the particular halogen present in the compound of the general formula and also upon the halogen present in the monohalohydrin. As used herein, a halogen acceptor is any compound that will accept or neutralize the halogen acid formed. The amount of halogen acceptor introduced into the reaction mixture will therefore be determined by the number of halogen atoms freed during the reaction. In order to insure a complete acceptance or neutralization of the liberated halogen an excess of halogen acceptor may be introduced into the reaction mass without being detrimental to the desired reaction. Any excess halogen acceptor present may be easily separated from the reaction product. Suitable halogen acceptors are such inorganic basic materials as sodium hydroxide, calcium oxide, barium oxide, sodium carbonate, potassium hydroxide, sodium bicarbonate, calcium hydroxide, potassium oxide, barium carbonate, barium hydroxide, sodium aluminate and the like.

One of the essential reactants in the preparation of the copolymer used in the present invention is a polymerizable compound containing a CH$_2$=C< group, which compound is different from an alpha, beta unsaturated carboxylic acid. Amongst the specific compounds of this class, which may be used, are the styrenes both ring substituted and side chain substituted styrenes as well as styrene per se. Amongst the side chain substituted styrenes which may be used are alpha methyl styrene, alpha ethyl styrene, alpha chloro styrene and the like. Amongst the ring substituted styrenes which may be used are the ortho, meta or para alkyl styrenes such as o-methyl styrene, n-ethyl styrene, p-propyl styrene, or the polyalkyl styrenes such as 2,4-dimethyl styrene, 2,5-diethyl styrene, 3,4-dimethyl styrene and the like. Other ring substituted styrenes that may be used are the o, m or p halo styrenes such as o-chloro styrene, p-bromo styrene, m-iodo styrene, 2,4-dichloro styrene, 2,5-dichloro styrene, 3,4-dibromo styrene and the like. Other halo substituents such as iodo and fluoro in these and comparable positions may be used. Other alkyl substituents, then, such as those set forth hereinabove may be substituted on the ring such as isopropyl, butyl, pentyl, hexyl and the like. Illustrative of other compounds which may be used are acrylonitrile, methacrylonitrile, ethacrylonitrile or the alkyl esters of alpha, beta unsaturated carboxylic acids containing a polymerizable $CH_2=C<$ group, such as the methyl, ethyl, propyl, butyl, hexyl, octyl ester of acrylic acid, methacrylic acid and the like. Amongst other compounds which may be used in this class are allyl alcohol, allyl acetate, methallyl alcohol, allyl lactate, the allyl ester of alpha-hydroxyisobutyric acid, allyl acrylate, allyl methacrylate, diallyl carbonate, diallyl malonate, diallyl oxalate, diallyl succinate, diallyl gluconate, diallyl methylgluconate, diallyl adipate, the diallyl ester of azelaic acid, diallyl sebacate, diallyl tartronate, diallyl tartrate, diallyl silicone, diallyl silicate, diallyl fumarate, diallyl maleate, diallyl mesaconate, diallyl citraconate, diallyl glutaconate, the diallyl ester of muconic acid, diallyl itaconate, diallyl phthalate, the diallyl ester of endomethylene tetrahydrophthalic anhydride, triallyl tricarballylate, triallyl aconitate, triallyl citrate, triallyl phosphate, trimethallyl phosphate, the diallyl ester of ethylene glycol dicarbonate, the diallyl ester of ethylene glycol dimalonate, the diallyl ester of ethylene glycol dioxalate, the diallyl ester of diethylene glycol dicarbonate, the diallyl ester of diethylene glycol dimalonate, the diallyl ester of diethylene glycol dioxalate, the diallyl ester of carbonic acid or of other dicarboxylic acids, diesters of other glycols, e. g., propylene glycol, the butylene glycols, triethylene glycol, etc., tetraallyl silicate and other tetraallyl esters.

The alpha, beta unsaturated carboxylic acids which may be used in the preparation of the polymers of the present invention may be either the monocarboxylic acids or the polycarboxylic acids, but it is necessary that the unsaturation in these acids be between the alpha, beta carbon atoms. Amongst those acids which may be used are acrylic acid, crotonic acid, isocrotonic acid, methacrylic, fumaric, maleic, glutaconic, citraconic, itaconic, and the like. Whenever available, the anhydrides of these acids may be used and furthermore mixtures of these acids or their anhydrides may be used in the prepartion of the products of the present invention. When the anhydrides are used, not more than 1 ethylenically unsaturated double bond should be present in the anhydride. The acid component of the reaction product designated sometimes in this case as (1) should be used in an amount sufficient so that the reaction product of the alpha, beta unsaturated carboxylic acid, the $CH_2=C<$ material with or without the alkyl ester of the alpha, beta unsaturated carboxylic acid has an acid number of at least about 15 and preferably between about 25 and 100. It is of course possible to have a polymer which has an acid number substantially in excess of 100 such as an acid number of 500.

The third reactant to the polymerization process is not imperative but is preferred and is identified sometimes in this case as (2) namely an alkyl ester of an alpha, beta unsaturated carboxylic acid. Included in that group would be alkyl esters such as the methyl, ethyl, propyl, isopropyl, butyl, pentyl, hexyl, octyl, nonyl, decyl, lauryl, octadecyl esters of such acids as acrylic acid, crotonic acid, isocrotonic acid, methacrylic acid, fumaric acid, maleic acid, glutaconic acid, citraconic acid, itaconic acid, and the like. The amount of the alkyl ester of the alpha, beta unsaturated carboxylic acid present in the preferred reaction mixture will depend on the amount of the polymerizable $CH_2=C<$ group type compound which is present. The ratio between the $CH_2=C<$ type compound and the alkyl ester of the alpha, beta unsaturated carboxylic acid should be not less than about 1:1, respectively, and not greater than about 6:1 $CH_2=C<$ group compound to ester, respectively. Preferably one would use a mol ratio of between about 2:1 and 4:1 with an optimum being observed at a mol ratio of 3:1.

The weight ratio between the polymer of (1) and (2) or (1), (2) and (3) and the oxirane triazine compound may be varied over a fairly substantial range such as between about 95:5 and 60:40, respectively. It is preferred, however, that the ratio in parts by weight between these reactants be between about 80:20 and 70:30, respectively.

In the practice of the process of the present invention, one may charge the alpha, beta unsaturated carboxylic acid, the $CH_2=C<$ type compound with or without the alkyl ester of the alpha, beta unsaturated carboxylic acid to a suitable reaction vessel and reacted to form the polymer having an acid number of at least 15 and thereafter mixing the polymer with the oxirane triazine derivative to produce the composition of the present invention. In order that the present invention may be more completely understood, the following examples are set forth in which all parts are parts by weight. These examples are set forth primarily for the purpose of illustration and any specific enumeration of detail contained therein should not be interpreted as a limitation on the case except as is indicated in the appended claims.

EXAMPLE 1

50 parts of amyl acetate is introduced into a suitable reaction vessel equipped with thermometer, stirrer and reflux condenser. The acetate is heated to the reflux temperature whereupon a mixture of 9.6 parts of glacial acrylic acid, 28.7 parts of styrene, 11.7 parts of butyl acrylate and 1.0 part of cumene hydroperoxide are added to the refluxing acetate in small quantities over a period of about one hour. When the addition of the mixture is complete the reaction mixture is refluxed for an additional 5 hours. The viscosity is Z4 plus on the Gardner-Holdt scale at 25° C. and at an acid number of 149.5. A mixture of 60 parts of the copolymer thus prepared and 40 parts of glycidyl cyanurate is prepared and a film is drawn down on a steel panel and baked for 30 minutes at 300° F. The film thus produced had good mar resistance and good alkali resistance.

A comparable film was drawn down from a composition comprising 60 parts of the copolymer prepared as indicated hereinabove in a mixture with 40 parts of diglycidyl phthalate and baked for 30 minutes at 300° F. This film proved to be not mar resistant at all and had very poor alkali resistance and was poorly resistant to amyl acetate.

A comparable film was drawn down from the copolymer alone as prepared hereinabove and the film after baking for 30 minutes at 300° F. was not mar resistant, was very brittle and had poor resistance to amyl acetate.

A comparable film was drawn down under the same conditions from glycidyl cyanurate alone and the film was hard, but brittle and displayed poor alkali resistance.

EXAMPLE 2

48 parts of acrylic acid, 423 parts of butyl acrylate, 1029 parts of styrene and 1500 parts amyl acetate are introduced into a suitable reaction chamber and refluxed for about 5 hours in the presence of 30 parts of cumene hydroperoxide. The acid number of the resulting polymer was 25, the viscosity was S on the Gardner-Holdt scale at 25° C., the color was 1 (Gardner-Holdt) and the appearance was clear. 70 parts of the copolymer solids thus prepared and 30 parts of triglycidyl cyanurate are blended and a film is drawn down and is baked for 30 minutes at 300° F. The film displayed enhanced mar resistance and good alkali resistance.

EXAMPLE 3

96 parts of acrylic acid, 408 parts of butyl acrylate and 996 parts of styrene, 1500 parts of amyl acetate and 30 parts of cumene hydroperoxide are introduced into a suitable reaction chamber equipped as in Example 1 and is heated at reflux temperature for about 5 hours. The acid number of the copolymer thus produced was about 50, the viscosity U+ on the Gardner-Holt scale at 25° C. and the color 1 (Gardner-Holdt). The appearance of the solution was clear. 70 parts of the copolymer solids and 30 parts of triglycidyl cyanurate are blended together and a film is drawn down which is baked for 30 minutes at 300° F. The resulting film was clear, had an excellent mar resistance and very good resistance to solvents such as alkalis and amyl acetate.

EXAMPLE 4

192 parts of acrylic acid, 381 parts of butyl acrylate, 927 parts of styrene, 1500 parts of amyl acetate and 30 parts of cumene hydroperoxide are introduced into a suitable reaction vessel comparable to that used in Example 1 and the mixture is heated at about the reflux temperature for 5 hours. The resulting copolymer solution had an acid number of 100, a viscosity of Y on the Gardner-Holdt scale and a color of 1 (Gardner-Holdt). The appearance of the solution was clear.

A 70:30 mixture of this copolymer and triglycidyl cyanurate is prepared and a film is drawn down from this solution and is baked for about 30 minutes at 300° F. The resultant film is clear, had excellent mar resistance and excellent solvent resistance.

Examples 2, 3 and 4 are repeated except in the place of the amyl acetate the solvent used was methyl Cellosolve. In each instance the acid number again was 25, 50 and 100, respectively, the viscosities were $Y-Z$, $Z+\frac{1}{3}$ bubble, and $Z1-\frac{1}{4}$ bubble, respectively. Each of these copolymers displayed a slight haze in the solution. When films are drawn down from a mixture of the copolymers in a 70:30 ratio with triglycidyl cyanurate and baked for 30 minutes at 300° F. excellent mar resistance and good to excellent solvent resistance was noted in each instance.

EXAMPLE 5

64 parts of glacial acrylic acid, 309 parts of styrene and 127 parts of butyl acrylate together with 10 parts of cumene hydroperoxide are added to 500 parts of refluxing methyl Cellosolve in comparatively small increments over a 1 hour period. The refluxing is continued for an additional 5 hours. The acid number of the ultimate copolymer is 100.6; the solids content is 48.6 and the conversion of monomer to polymer is 98.2 percent. The color (Gardner-1933) is $<1$. A 70:30 mixture of this copolymer and triglycidyl cyanurate is prepared and was evaluated as a white baking enamel which had a better curing cycle, chemical resistance and overbake than a commercially available enamel.

EXAMPLE 6

500 parts of methyl Cellosolve are introduced into a suitable reaction chamber equipped as in Example 1 and heated to reflux temperature. While maintaining the methyl Cellosolve at reflux, there is charged thereto a mixture of 32 parts of glacial acrylic acid, 332 parts of styrene, 136 of butyl acrylate, and 10 parts of cumene hydroperoxide. The mixture is added in comparatively small increments over a 1 hour period while being maintained at reflux and upon the completion of the addition, the reaction mixture is refluxed for an additional 5 hours. The viscosity of the copolymer solution was $Y-Z$ on the Gardner-Holdt scale at 25° C., the acid number 54.4, the solids in the solution were 47.5 percent and the conversion from monomers to polymer was 96.0 percent. The color of the copolymer solution was $<1$. A mixture of 70 parts of the copolymer solids and 30 parts of triglycidyl cyanurate were prepared as a white baking enamel and films were drawn down therefrom, which were then baked at 300° F. for 30 minutes. This film thus produced had better chemical resistance, better mar resistance and better flexibility and toughness than a standard commercial baking enamel. Still further, it was improved in its curing cycle and overbake.

EXAMPLE 7

1000 parts of a 50/50 mixture of xylol and butanol are introduced into a suitable reaction chamber equipped as in Example 1 and the mixture is heated to reflux temperature whereupon a mixture of 87 parts of maleic anhydride, 780 parts of styrene and 133 parts of acrylonitrile containing 20 parts of cumene hydroperoxide are introduced in small increments into the refluxing solvent over about a 1 hour period. The reaction is then continued until polymerization is substantially complete. The appearance of the solution is slightly cloudy and the viscosity on the Gardner-Holdt scale at 25° C. is $Z5-Z6$. A mixture is prepared comprising 70 parts (solids) of the copolymer thus prepared and 30 parts of triglycidyl cyanurate and a film is drawn down on glass using a 4 mil blade and the film is baked for 30 minutes at 300° F. The film thus produced is mar resistant, has a slight haze but has excellent adhesion and toughness.

EXAMPLE 8

Into a suitable reaction vessel equipped as in Example 1 there is introduced 1000 parts of a 50/50 mixture of xylol and butanol. The mixture is heated at the reflux temperature whereupon a mixture of 128 parts of glacial acrylic acid, 745 parts of styrene, 127 parts of acrylonitrile and 20 parts of cumene hydroperoxide are added in small increments, over about a 1 hour period. When the addition is complete, the refluxing is continued until a polymer having an acid number of about 100 is produced. The resulting polymeric solution is clear and has a viscosity of $Z_6$ on the Gardner-Holdt scale at 25° C. A mixture of 70 parts (solids) of the polymer thus prepared and 30 parts of triglycidyl cyanurate is prepared and films are drawn down on glass using a 4 mil blade which are then baked at 300° F. for 30 minutes. The resulting films are clear, have excellent mar resistance, adhesion and toughness.

Amongst the oxirane triazine compounds which may be used as one of the reactants in the practice of the process of the present invention are such compounds as:

Triglycidyl cyanurate, 2,4, diglycidyloxy-6-chloro, 1,3,5 triazine
2-glycidyloxy-4,6,dichloro-1,-1,3,5-triazine
2,4 diglycidyloxy-1,3,5-triazine
2,4-diglycidyloxy-6-phenyl-1,3,5-triazine
2,4-diglycidyloxy-6-methyl-1,3,5-triazine
4,6,-diglycidyloxy-2-alloxy-1,3,5-triazine
2,4,-dialloxy-6-glycidyloxy-1,3,5-triazine
2,4- diglycidyloxy-6-methoxy-1,3,5-triazine
2-amino-4,6-diglycidyloxy-1,3,5-triazine
2-butylamino-4,6, diglycidyloxy-1,3,5-triazine
2-diallylamino-4,6-diglycidyloxy-1,3,5-triazine
2,4-diamino-6-glycidyloxy-1,3,5-triazine
2-amino-4-glycidyloxy-6-methylamino-1,3,5-triazine
2-glycidyloxy-4-di (n-butyl) amino-6-ethylamino-1,3,5-triazine
2,4-bis (diallylamino)-6-glycidyloxy-1,3,5-triazine
2 - glycidyloxy-4-hexylamino-6-phenylethylamino - 1,3,5-triazine
2-amino-4-glycidyloxy-6-propyl-1,3,5-triazine
2-amino-4-glycidyloxy-6-propyl-1,3,5-triazine
2-glycidyloxy-4-ethylamino-6-phenyl-1,3,5-triazine
2-butyl-4-glycidyloxy-6-propylamino-1,3,5-triazine
2-glycidyloxy-4,6-bis(diallylamino)-1,3,5-triazine
2-glycidyloxy-4-methylamino-1,3,5-triazine
2-amino-4-glycidyloxy-1,3,5-triazine
2-amino-4-glycidyloxy-6-phenoxy-1,3,5-triazine
2-glycidyloxy-4-methylamino-6-methoxy-1,3,5-triazine
2-di(n-butyl)amino-4-glycidyloxy - 6 - methoxy - 1,3,5-triazine
2-glycidyloxy-4-diethylamino-6-phenoxy-1,3,5-triazine
2 - glycidyloxy - 4 - ethoxy - 6 - octylamino - 1,3,5-triazine
2 - cyclohexylamino - 4 - ethoxy - 6 - glycidyloxy - 1,3,5-triazine
2,4-diethoxy-6-glycidyloxy-1,3,5-triazine
2-glycidyloxy-4,6-diphenoxy-1,3,5-triazine
2-glycidyloxy-4-phenoxy-1,3,5-triazine 2,4-diglycidyloxy-6-phenoxy-1,3,5-triazine
2-glycidyloxy-1,3,5-triazine
2 - glycidyloxy - 4 - decyl - 6 - tertiary-butylphenoxy-1,3,5-triazine
2 - glycidyloxy - 4 - phenyl - 6 - p - tertiary butylphenoxy-1,3,5-triazine
2-glycidyloxy-4,6-dipropyl-1,3,5-triazine
2-glycidyloxy-4-methyl-1,3,5-triazine
2-glycidyloxy-4-chloro-1,3,5-triazine
2-glycidyloxy-4-bromo-6-phenyl-1,3,5-triazine
2-glycidyloxy-4-chloro-6-methyl-1,3,5-triazine
4-glycidyloxy-6-iodo-2-alloxy-1,3,5-triazine
2-glycidyloxy-4-chloro-6-methoxy-1,3,5-triazine
2-amino-4-chloro-6-glycidyloxy-1,3,5-triazine
2-butylamino-4-bromo-6-glycidyloxy-1,3,5-triazine
2 - diallylamino - 4 - chloro - 6 - glycidyloxy - 1,3,5-triazine, and the like.

In the preparation of the copolymers of the present invention, one may operate without benefit of a solvent medium although it is preferred that an inert organic solvent such as any of the aliphatic or aromatic solvents be used. The aromatic solvents which may be used are benzene, xylene, toluene and the like. One may use, additionally, mineral spirits such as Varsol #1, Varsol #2, kerosene and the like. Additionally, one may make use of such solvents as butyl acetate, amyl acetate, benzyl ether, mono benzyl ether of ethylene glycol, mono butyl ether of ethylene glycol, Carbitol (monoethyl ether of diethylene glycol), methyl cellosolve (monomethyl ether of ethylene glycol), ethyl cellosolve (monoethyl ether of ethylene glycol), ethyl cellosolve acetate and the like. Wherever desired, mixtures of these solvents may be used. The amount of solvent which is used will depend on the viscosity of the polymer solution ultimately desired and can be varied over a very wide range.

In the preparation of the copolymers used in the present invention, it is generally desired that a catalyst be employed for the polymerization reaction. Any of the conventional polymerization catalysts may be used in this connection. Representative members of the group of catalysts are benzoyl peroxide, tertiary butyl hydroperoxide, ditertiary butyl peroxide, 2,2-bis(tertiary butyl peroxy) butane, cumene hydroperoxide, methyl ethyl ketone peroxide, diethyl ketone peroxide and the like. The amounts of catalysts employed will be within conventional amounts such as between about 0.01 percent and 10 percent by weight based on the total weight of polymerizable materials present. Preferably one would use between about 0.1 percent and 3 percent by weight, same basis.

We claim:

1. A process comprising heat reacting the copolymer of (1) an alpha, beta ethylenically unsaturated carboxylic acid, (2) an alkyl ester of an alpha, beta ethylenically unsaturated carboxylic acid and (3) a polymerizable compound containing a $CH_2=C<$ group different from (1) and (2) in an inert organic solvent, with (4) the dehydrohalogenated reaction product of a monohalohydrin of a saturated aliphatic trihydric alcohol and a compound having the general formula:

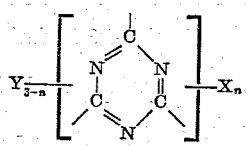

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" whrein R" represents a member selected from the group consisting of alkyl, alkenyl, aryl, alkaryl and aralkyl radicals, and $n$ represents an integer which is at least 1 and not more than 3, wherein the halo group of said monohalohydrin is a member selected from the group consisting of chloro, bromo and iodo, wherein the amount (1) added is sufficient to give copolymer of (1), (2) and (3) an acid number of at least 15, wherein the mol ratio of (2):(3) is between about 1:1 and 1:6, and wherein the weight ratio of the copolymer of (1), (2) and (3) to (4) is between about 95:5 and 60:40.

2. A process comprising heat reacting the copolymer of (1) acrylic acid, (2) styrene, (3) butyl acrylate with (4) a glycidyl cyanurate, in the presence of an inert organic solvent wherein said copolymer has an acid number of at least 15, the mol ratio of (2):(3) is between 1:1 to 6:1 and the weight ratio of (1), (2) and (3) to (4) is between about 95:5 and 60:40.

3. A process comprising heat reacting the copolymer of (1) acrylic acid, (2) butyl acrylate and (3) styrene in an inert organic solvent, said copolymer having an acid number of at least 15, with (4) triglycidyl cyanurate wherein the mol ratio of (2):(3) is between about 1:1 and 1:6, and wherein the weight ratio of the copolymer of (1), (2) and (3) to (4) is between about 95:5 and 60:40.

4. A process comprising heat reacting the copolymer of (1) an alpha, beta ethylenically unsaturated carboxylic acid, (2) an alkyl ester of an alpha, beta ethylenically unsaturated carboxylic acid and (3) a polymerizable compound containing a $CH_2=C<$ group and is different from (1) and (2) in an inert organic solvent, with (4) the dehydrohalogenated reaction product of a monohalohydrin of a saturated aliphatic trihydric alcohol and a compound having the general formula:

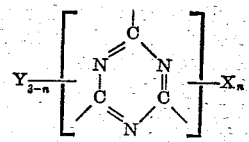

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represent a member having the same meaning as (a), and (c) radicals represented by the formula —OR" wherein R" represents a member selected from the group consisting of alkyl, alkenyl, aryl, alkaryl and aralkyl radicals, and $n$ represents an integer which is at least 1 and not more than 3, wherein the halo group of said monohalohydrin is a member selected from the group consisting of chloro, bromo and iodo, wherein the amount (1) added is sufficient to give copolymer of (1), (2) and (3) an acid number of between 25 and 100, wherein the mol ratio of (2):(3) is between about 1:1 and 1:6, and wherein the weight ratio of the copolymer of (1), (2) and (3) to (4) is between about 95:5 and 60:40.

5. A process comprising heat reacting the copolymer of (1) an alpha, beta ethylenically unsaturated carboxylic acid, (2) an alkyl ester of an alpha, beta ethylenically unsaturated carboxylic acid and (3) a polymerizable compound containing a $CH_2=C<$ group and different from (1) and (2) in an inert organic solvent, with (4) the dehydrohalogenated reaction product of a monohalohydrin of a saturated aliphatic trihydric alcohol and a compound having the general formula:

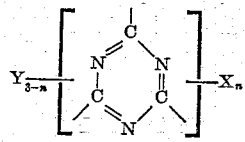

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR′ where R and R′ each represents a member having the same meaning as (a), and (c) radicals represented by the formula —OR″ wherein R″ represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein the amount of (1) added to form the copolymer is sufficient to give a copolymer of (1), (2) and (3) an acid number of between 25 and 100, wherein the mol ratio of (2):(3) is between about 1:2 and 1:4, wherein the weight ratio of (1), (2) and (3) to (4) is between about 80:20 and 70:30.

6. A process comprising heat reacting the copolymer of (1) acrylic acid, (2) butyl acrylate and (3) styrene in an inert organic solvent, said copolymer having an acid number between about 25 and 100, with (4) triglycidyl cyanurate, wherein the mol ratio of (2):(3) is between about 1:2 and 1:4 and wherein the weight ratio of (1), (2) and (3) to (4) is between about 80:20 and 70:30.

7. A composition of matter comprising the reaction mixture of (A) a copolymer of (1) an alpha, beta ethylenically unsaturated carboxylic acid, (2) an alkyl ester of an alpha, beta ethylenically unsaturated carboxylic acid and (3) a polymerizable compound containing a $CH_2=C<$ group and different from (1) and (2) with (B) the dehydrohalogenated reaction product of a monohalohydrin of a saturated aliphatic trihydric alcohol and a compound having the general formula:

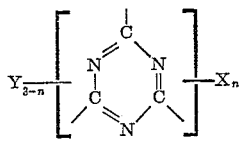

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR′ where R and R′ each represents a member having the same meaning as (a), and (c) radicals represented by the formula —OR″ wherein R″ represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, dispersed in an inert organic solvent wherein said copolymer has an acid number of at least 15, the mol ratio of (2):(3) is between about 1:1 and 1:6 respectively, and the weight ratio of (A) to (B) is between about 95:5 and 60:40.

8. A composition of matter comprising the reaction product of (A) a copolymer of (1) acrylic acid, (2) butyl acrylate and (3) styrene and (B) triglycidyl cyanurate in an inert organic solvent wherein said copolymer has an acid number of at least 15, the mol ratio of (2):(3) is between about 1:1 and 1:6 respectively, and the weight ration of (A) to (B) is between about 95:5 and 60:40.

9. A composition of matter comprising the reaction product of (A) a copolymer of (1) maleic anhydride, (2) butyl methacrylate and (3) 2,4-dimethyl styrene, and (B) triglycidyl cyanurate in an inert organic solvent wherein said copolymer has an acid number of at least 15, the mol ratio of (2):(3) is between about 1:1 and 1:6 respectively, and the weight ratio of (A) to (B) is between about 95:5 and 60:40.

10. A composition of matter comprising the reaction product of (A) a copolymer of (1) an alpha, beta ethylenically unsaturated carboxylic acid, (2) an alkyl ester of an alpha, beta ethylenically unsaturated carboxylic acid and (3) a polymerizable compound containing a $CH_2=C<$ group and different from (1) and (2) with (B) the dehydrohalogenated reaction product of a monohalohydrin of a saturated aliphatic trihydric alcohol and a compound having the general formula:

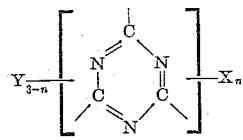

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR′ where R and R′ each represents a member having the same meaning as (a), and (c) radicals represented by the formula —OR″ wherein R″ represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein the acid number of said copolymer is at least 15, wherein the mol ratio of (2):(3) is between 1:1 and 1:6 and the weight ratio of (A) to (B) is between about 95:5 and 60:40.

11. A composition of matter comprising the reaction product of (A) a copolymer of (1) an alpha, beta ethylenically unsaturated carboxylic acid, (2) an alkyl ester of an alpha, beta ethylenically unsaturated carboxylic acid and (3) a polymerizable compound containing a $CH_2=C<$ group different from (1) and (2) with (B) the dehydrohalogenated reaction product of a monohalohydrin of a saturated aliphatic trihydric alcohol and a compound having the general formula:

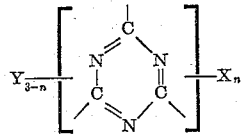

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR′ where R and R′ each represents a member having the same meaning as (a), and (c) radicals represented by the formula —OR″ wherein R″ represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein the acid number of said copolymer is between 25 and 100, wherein the mol ratio of (2):(3) is between about 1:2 and 1:4 and the weight ratio of (A) to (B) is between about 80:20 and 70:30.

12. A composition of matter comprising the reaction product of (A) a copolymer of (1) acrylic acid, (2) butyl acrylate and (3) styrene with (B) triglycidyl cyanurate wherein the acid number of said copolymer is at least 15, wherein the mol ratio of (2):(3) is between about 1:1 and 1:6 and the weight ratio of (A) to (B) is between about 95:5 and 60:40.

13. A composition of matter comprising the reaction product of (A) a copolymer of (1) acrylic acid, (2) butyl acrylate and (3) styrene with (B) triglycidyl cyanurate wherein the acid number of said copolymer is between 25 and 100, wherein the mol ratio of (2):(3) is between about 1:2 and 1:4 and the weight ratio of (A) to (B) is between about 80:20 and 70:30.

14. A composition of matter comprising the reaction product of (A) a copolymer of (1) maleic anhydride, (2)

butyl methacrylate and (3) 2,4-dimethyl styrene with (B) triglycidyl cyanurate wherein the acid number of said copolymer is at least 15, wherein the mol ratio of (2):(3) is between about 1:1 and 1:6 and the weight ratio of (A) to (B) is between about 95:5 and 60:40.

15. A composition of matter comprising the reaction product of (A) a copolymer of (1) maleic anhydride, (2) butyl methacrylate and (3) 2,4-dimethyl styrene with (B) triglycidyl cyanurate wherein the acid number of said copolymer is between 25 and 100, wherein the mol ratio of (2):(3) is between about 1:2 and 1:4 and the weight ratio of (A) to (B) is between about 80:20 and 70:30.

16. A process comprising heat reacting the copolymer of (1) an alpha, beta ethylenically unsaturated carboxylic acid and (2) a different polymerizable compound containing a $CH_2=C<$ group in an inert organic solvent, with (3) the dehydrohalogenated reaction product of a monohalohydrin of a saturated trihydric alcohol and a compound having the general formula:

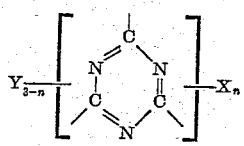

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein the amount (1) added is sufficient to give copolymer of (1) and (2) an acid number of at least 15, and wherein the weight ratio of the copolymer of (1) and (2) to (3) is between about 95:5 and 60:40.

17. A process comprising heat reacting the copolymer of (1) an alpha, beta ethylenically unsaturated carboxylic acid and (2) a different polymerizable compound containing a $CH_2=C<$ group in an inert organic solvent, with (3) the dehydrohalogenated reaction product of a monohalohydrin of a saturated trihydric alcohol and a compound having the general formula:

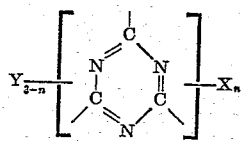

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said momohalohydrin is a member selected from the group consisting of chloro, bromo and iodo, wherein the amount (1) added is sufficient to give the copolymer of (1) and (2) an acid number of between 25 and 100, and wherein the weight ratio of the copolymer of (1) and (2) to (3) is between about 95:5 and 60:40.

18. A process comprising heat reacting the copolymer of (1) an alpha, beta ethylenically unsaturated carboxylic acid and (2) a different polymerizable compound containing a $CH_2=C<$ group in an inert organic solvent, with (3) the dehydrohalogenated reaction product of a monohalohydrin of a saturated trihydric alcohol and a compound having the general formula:

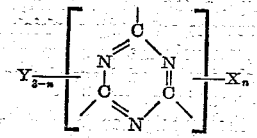

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said momohalohydrin is a member selected from the group consisting of chloro, bromo and iodo, wherein the amount (1) added is sufficient to give the copolymer of (1) and (2) an acid number of 25, and wherein the weight ratio of the copolymer of (1) and (2) to (3) is 75:25.

19. A process comprising heat reacting the copolymer of (1) an alpha, beta ethylenically unsaturated carboxylic acid and (2) a different polymerizable compound containing a $CH_2=C<$ group in an inert organic solvent, with (3) the dehydrohalogenated reaction product of a monohalohydrin of a saturated trihydric alcohol and a compound having the general formula:

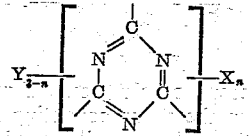

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein the amount of (1) in the copolymer is sufficient to give an acid number of between about 25 and 100, and wherein the weight ratio of (1) and (2) to (3) is between about 80:20 and 70:30.

20. A process comprising heat reacting the copolymer of (1) an alpha, beta ethylenically unsaturated carboxylic acid and (2) a different polymerizable compound having a $CH_2=C<$ group in an inert organic solvent, with (3) the dehydrohalogenated reaction product of a monohalohydrin of a saturated trihydric alcohol and a compound having the general formula:

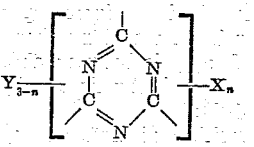

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein the amount of (1) in the copolymer is sufficient to give an acid number of 25, wherein the weight ratio of (1) and (2) to (3) is 75:25.

21. A composition of matter comprising a mixture of (A) the reaction product of (1) an alpha, beta ethylenically unsaturated carboxylic acid and (2) a different polymerizable compound containing a CH₂=C< group and (B) the dehydrohalogenated reaction product of a monohalohydrin of a saturated trihydric alcohol and a compound having the general formula:

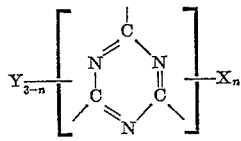

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, dispersed in an inert organic solvent wherein the copolymer has an acid number of at least 15 and the weight ratio of (A) to (B) is between about 95:5 and 60:40.

22. A composition of matter comprising a mixture of (A) a copolymer of (1) an alpha, beta ethylenically unsaturated carboxylic acid and (2) a different polymerizable compound containing a CH₂=C< group and (B) the dehydrohalogenated reaction product of a monohalohydrin of a saturated trihydric alcohol and a compound having the general formula:

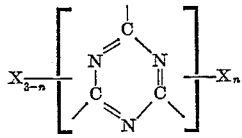

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein the acid number of said copolymer is between 25 and 100, and wherein the weight ratio of (A) to (B) is between about 80:20 and 70:30.

23. A composition of matter comprising a mixture of (A) a copolymer of (1) an alpha, beta ethylenically unsaturated carboxylic acid and (2) a different polymerizable compound containing a CH₂=C< group and (B) the dehydrohalogenated reaction product of a monohalohydrin of a saturated trihydric alcohol and a compound having the general formula:

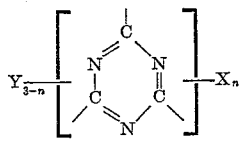

wherein X represents a halo group, Y represents a member selected from the group consisting of (a) a member selected from the group consisting of hydrogen, alkyl, alkenyl, aryl, alkaryl and aralkyl radicals, (b) amine radicals represented by the formula —NRR' where R and R' each represents a member having the same meaning as (a), and (c) radicals represented by the formula —OR" wherein R" represents a member selected from the group consisting of alkyl, alkenyl, aryl, alkaryl and aralkyl radicals, and n represents an integer which is at least 1 and not more than 3, wherein the halo group of said monohalohydrin is a member selected from the group consisting of chloro, bromo and iodo, wherein said copolymer has an acid number of 25, and wherein the weight ratio of (A) to (B) is 75:25.

24. A composition of matter comprising a mixture of (A) a copolymer of methacrylic acid and styrene, said copolymer having an acid number of at least 15 and (B) triglycidyl cyanurate wherein the weight ratio of (A) to (B) is between about 95:5 and 60:40.

25. A composition of matter comprising a mixture of (A) a copolymer of acrylic acid and styrene, said copolymer having an acid number of at least 15 and (B) triglycidyl cyanurate wherein the weight ratio of (A) to (B) is between about 95:5 and 60:40.

26. A composition of matter comprising a mixture of (A) a copolymer of (1) methacrylic acid, (2) butyl methacrylate and (3) styrene and (B) triglycidyl cyanurate wherein said copolymer has an acid number of at least 15 wherein the mol ratio of (2) to (3) is between about 1:1 and 1:6, respectively, and wherein the weight ratio of (A) to (B) is between about 95:5 and 60:40.

27. A composition of matter comprising a mixture of (A) a copolymer of (1) methacrylic acid, (2) butyl methacrylate and (3) styrene and (B) triglycidyl cyanurate wherein said copolymer has an acid number of between about 25 and 100, wherein the mol ratio of (2) to (3) is between about 1:2 and 1:4, respectively, and wherein the weight ratio of (A) to (B) is between about 80:20 and 70:30.

References Cited in the file of this patent
UNITED STATES PATENTS

| | | |
|---|---|---|
| 2,604,457 | Segall et al. | July 22, 1952 |
| 2,604,464 | Segall et al. | July 22, 1952 |
| 2,741,607 | Bradley et al. | Apr. 10, 1956 |